(12) United States Patent
Gilady et al.

(10) Patent No.: US 9,898,555 B2
(45) Date of Patent: *Feb. 20, 2018

(54) SYSTEMS AND METHODS TO AUTOMATICALLY SUGGEST ELEMENTS FOR A CONTENT AGGREGATION SYSTEM

(71) Applicant: SAP Portals Israel Ltd, Ra'Anana (IL)

(72) Inventors: Aviad Gilady, Kerem Ben Shemen (IL); Yotam Kadishay, Tel-Aviv (IL); Oleg Kossoy, Netanya (IL); Eyal Nathan, Modiin (IL); Tomer Pelleg, Tel-Aviv (IL); Roman Talyansky, Haifa (IL)

(73) Assignee: SAP PORTALS ISRAEL LTD., Ra'Anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,838

(22) Filed: Apr. 4, 2017

(65) Prior Publication Data

US 2017/0206213 A1 Jul. 20, 2017

Related U.S. Application Data

(63) Continuation of application No. 14/275,400, filed on May 12, 2014, now Pat. No. 9,646,059.

(51) Int. Cl.
*G06F 17/30* (2006.01)
*G06Q 10/10* (2012.01)

(52) U.S. Cl.
CPC ...... *G06F 17/3097* (2013.01); *G06F 17/3051* (2013.01); *G06F 17/30896* (2013.01); *G06Q 10/1095* (2013.01)

(58) Field of Classification Search
CPC .................................................. G06F 17/30696
USPC ........................................ 707/722, 805, 810
See application file for complete search history.

(56) References Cited

U.S. PATENT DOCUMENTS

| | | | |
|---|---|---|---|
| 9,122,759 B2 * | 9/2015 | Carter | G06F 17/30861 |
| 9,477,785 B2 * | 10/2016 | Sen | G06F 17/30994 |
| 2006/0282772 A1 * | 12/2006 | Chamberlin | G06F 3/0482 715/700 |
| 2012/0017182 A1 * | 1/2012 | Bau | G06F 3/04812 715/859 |
| 2013/0282689 A1 * | 10/2013 | Stouffer | G06F 17/30864 707/709 |

(Continued)

*Primary Examiner* — Baoquoc N To
(74) *Attorney, Agent, or Firm* — Buckley, Maschoff & Talwalkar LLC

(57) ABSTRACT

According to some embodiments, a suggestion platform associated with a content aggregation system may access a plurality of data context trigger criteria associated with potential business information content elements. Each data context trigger criteria may include, for example: (i) a data locator associated with a business information data structure, (ii) an operator, and (iii) a threshold. For each data context trigger criteria, it may be automatically determined if a value in the business information data structure satisfies the data context trigger criteria based on the operator and the threshold. When a data context trigger criteria is satisfied, it may be automatically suggested to a user that the potential business information content element associated with that data context trigger criteria be added to a user display of the content aggregation system.

27 Claims, 12 Drawing Sheets

(56) References Cited

U.S. PATENT DOCUMENTS

| | | | |
|---|---|---|---|
| 2014/0280063 A1* | 9/2014 | Sen | G06F 17/30994 |
| | | | 707/722 |
| 2015/0100356 A1* | 4/2015 | Bessler | G06Q 10/0631 |
| | | | 705/7.12 |
| 2015/0227879 A1* | 8/2015 | Bertanzetti | G06Q 50/01 |
| | | | 705/7.14 |
| 2015/0227901 A1* | 8/2015 | Bertanzetti | G06Q 20/108 |
| | | | 705/42 |
| 2015/0227902 A1* | 8/2015 | Bertanzetti | G06Q 20/108 |
| | | | 705/42 |
| 2016/0142542 A1* | 5/2016 | Li | H04M 3/42348 |
| | | | 379/265.09 |

* cited by examiner

| USER IDENTIFIER 1102 | ROLE 1104 | CONTENT 1106 | CONTENT 1108 |
|---|---|---|---|
| U_101 | MANAGER | EMAIL | TURBINE MONITOR |
| U_102 | CEO | REVENUE GRAPH | OPEN PURCHASE ORDER DASHBOARD DIAL |

SYSTEMS AND METHODS TO AUTOMATICALLY SUGGEST ELEMENTS FOR A CONTENT AGGREGATION SYSTEM

CROSS-REFERENCE TO RELATED APPLICATION

This is a continuation of co-pending prior U.S. Patent Application No. 14/275,400, filed on May. 12, 2014, entitled "SYSTEMS AND METHODS TO AUTOMATICALLY SUGGEST ELEMENTS FOR A CONTENT AGGREGATION SYSTEM", which is incorporated herein by reference in its entirety for all purposes.

FIELD

Some embodiments relate to systems and methods associated with content aggregation system, such as a business portal. More specifically, some embodiments are directed to systems and methods wherein content for a content aggregation system may be automatically suggested to a user.

BACKGROUND

Users may interact with a content aggregation system to view and adjust information associated with a business enterprise application. For example, a user may customize and design a web portal home page that contains user interface elements that he or she uses on a regular basis (e.g., a link to an email application, a particular sales chart, etc.). In some cases, users may select from hundreds of such elements. Many users, however, may be unaware of applications and other types of content that are not frequently used. Moreover, as business conditions change, different elements may become more relevant to particular users.

Accordingly, methods and mechanisms to efficiently, accurately, and/or automatically suggest elements for a content aggregation system based on a business context may be provided in accordance with some embodiments described herein.

SUMMARY

Some embodiments provide a system, method, program code and/or means to automatically suggest elements for a content aggregation system based on a business context. According to some embodiments, a suggestion platform associated with a content aggregation system may access a plurality of data context trigger criteria associated with potential business information content elements. Each data context trigger criteria may include, for example: (i) a data locator associated with a business information data structure, (ii) an operator, and (iii) a threshold. For each data context trigger criteria, it may be automatically determined if a value in the business information data structure satisfies the data context trigger criteria based on the operator and the threshold. When a data context trigger criteria is satisfied, it may be automatically suggested to a user that the potential business information content element associated with that data context trigger criteria be added to a user display of the content aggregation system.

With these and other advantages and features that will become hereinafter apparent, further information may be obtained by reference to the following detailed description and appended claims, and to the figures attached hereto.

BRIEF DESCRIPTION OF THE DRAWINGS

FIG. 11 illustrates a portion of a portal database that might be stored in accordance with some embodiments.

DETAILED DESCRIPTION

Users may interact with a content aggregation system to view and adjust information associated with a business enterprise application. For example, a user may customize and design a web portal home page that contains user interface elements that he or she uses on a regular basis (e.g., a link to a calendar application, an engine monitoring dashboard, etc.). In some cases, users may select from hundreds of such elements. Many users, however, may be unaware of applications and other types of content that are not frequently used. Moreover, as business conditions change, different elements may become more relevant to particular users.

Figure 1:
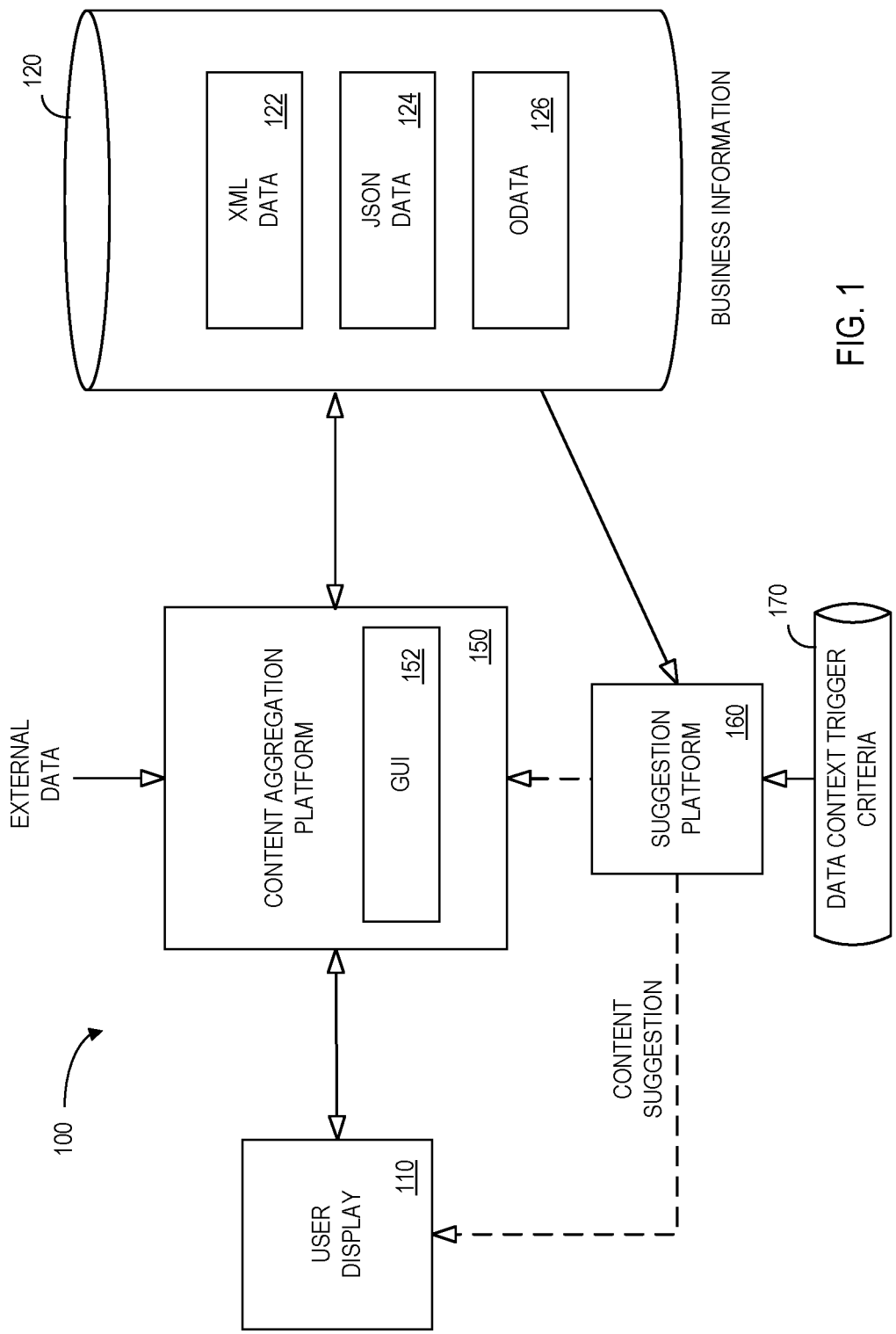
FIG. 1 is a block diagram of a system architecture according to some embodiments.

Accordingly, methods and mechanisms to efficiently, accurately, and/or automatically suggest elements for a content aggregation system based on a business context may be provided in accordance with some embodiments described herein. FIG. 1 is a block diagram of a system 100 according to some embodiments. The system 100 includes a user display 110 that can be used to receive and/or interact with business information 120. The mobile user device 110 might be associated with, by ways of example only, Personal Computer (PC), a mobile computer, a smartphone, etc. According to some embodiments, a content aggregation platform 150 (e.g., associated with a business portal) may receive the business information 120 and/or external data (stock information, weather information, etc.) and, via Graphical User Interface ("GUI") application 152, provide an aggregated display of elements to the user display 110. For example, a user might customize a home page or business portal to include elements that he or she frequently uses.

According to some embodiments, a suggestion platform 160 may access data context trigger criteria 170 and, based on the current context of the business information 120, provide one or more content suggestions via the user display 110. Note that the suggestion platform 160 might be co-located and/or be formed as part of, the content aggregation platform 150.

By way of example only, business information 120 and/or content aggregation platform 150 might be associated with an Enterprise Resource Planning ("ERP") server, a business services gateway, a HyperText Transfer Protocol ("HTTP")

server, a Client Relationship Management ("CRM") system, and/or an Advanced Business Application Programming ("ABAP") server. Note that the business information 120 may be associated with one or more formats, including Extensible Markup Language ("XML") data 122, JavaScript Object Notation ("JSON") data 124, and/or Open Data protocol ("OData") information 126.

According to some embodiments, the content aggregation platform 150 may directly communicate with one or more remote user displays 110 via the Internet. The user displays 110 may include one or more processors to receive electronic files and/or to execute applications and/or components (e.g., a plug-in that is integrated to a smartphone).

Note that FIG. 1 represents a logical architecture for the system 100 according to some embodiments, and actual implementations may include more or different components arranged in other manners. Moreover, each element described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the suggestion platform 160, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
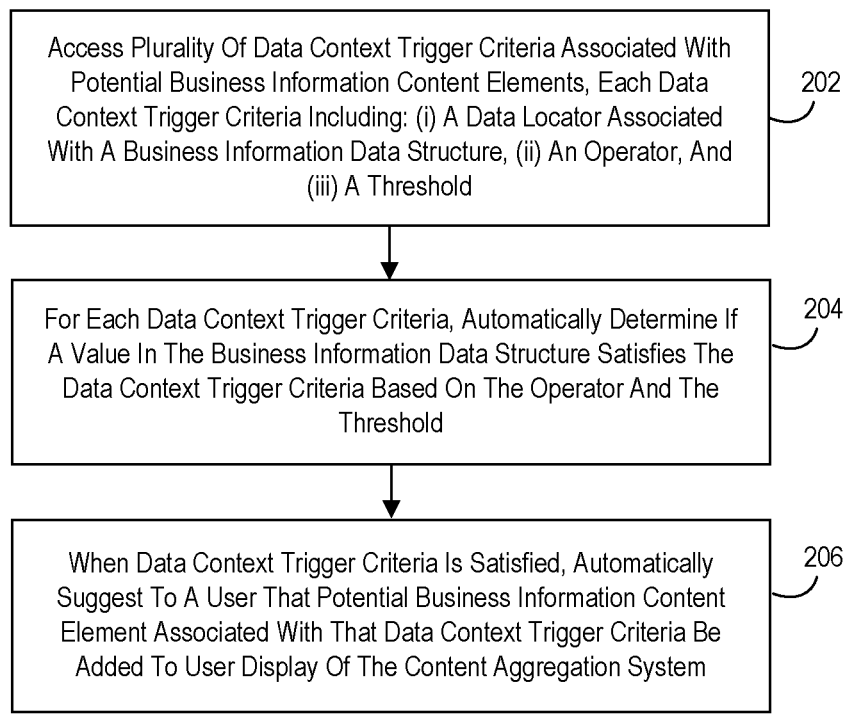
FIG. 2 is a flow diagram of a process in accordance with some embodiments.

FIG. 2 is a flow diagram of a process 200 that might be associated with the illustration of the system 100 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 202, a suggestion platform may access a plurality of data context trigger criteria associated with potential business information content elements, each data context trigger criteria including: (i) a data locator associated with a business information data structure, (ii) an operator, and (iii) a threshold. Consider, by way of example, a purchase order application that is available to be included by users on a business portal homepage. In this case, the data locator may point to a location in a data structure that indicates how may open purchase orders are currently associated with a particular user. The operator might indicate "greater than" and the threshold might indicate "5 open purchase orders."

For each data context trigger criteria, the suggestion platform may automatically determine at 204 if a value in the business information data structure satisfies the data context trigger criteria based on the operator and the threshold. Note that this step might be performed in substantially real time, on a periodic basis (nightly), and/or upon a user action (e.g., he or she logs in, opens a particular application, etc.). Further note that a plurality of data context trigger criteria might be associated with a single potential business information content element. Similarly, a single data context trigger criteria might, according to some embodiments, be associated with a plurality of potential business information content elements.

When a data context trigger criteria is satisfied, the suggestion platform may at 206 automatically suggest to a user that the potential business information content element associated with that data context trigger criteria be added to a user display of the content aggregation system.

Figure 3:
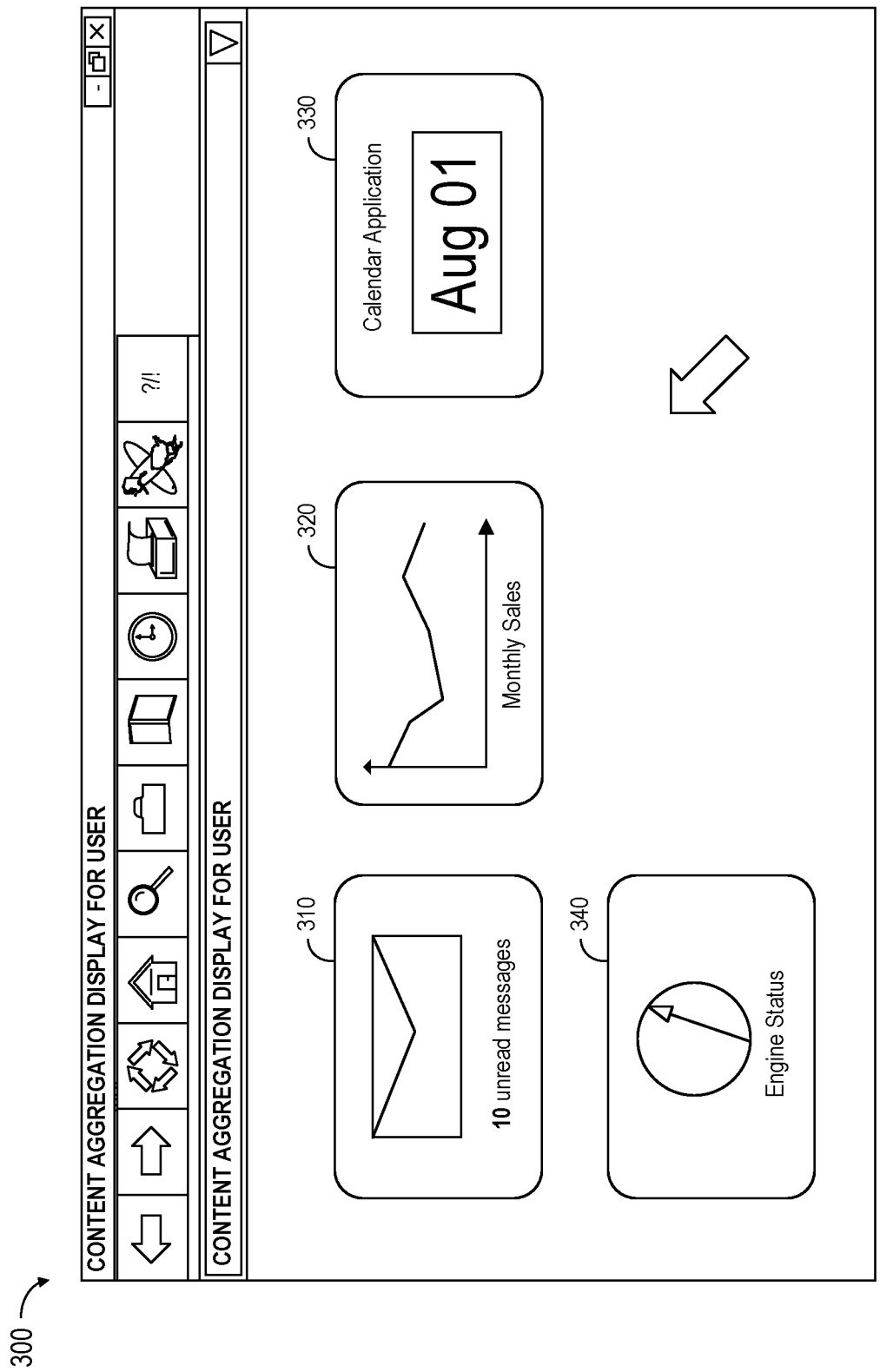
FIGS. 3 and 4 are examples of a business content aggregation system display according to some embodiments.
Figure 4:
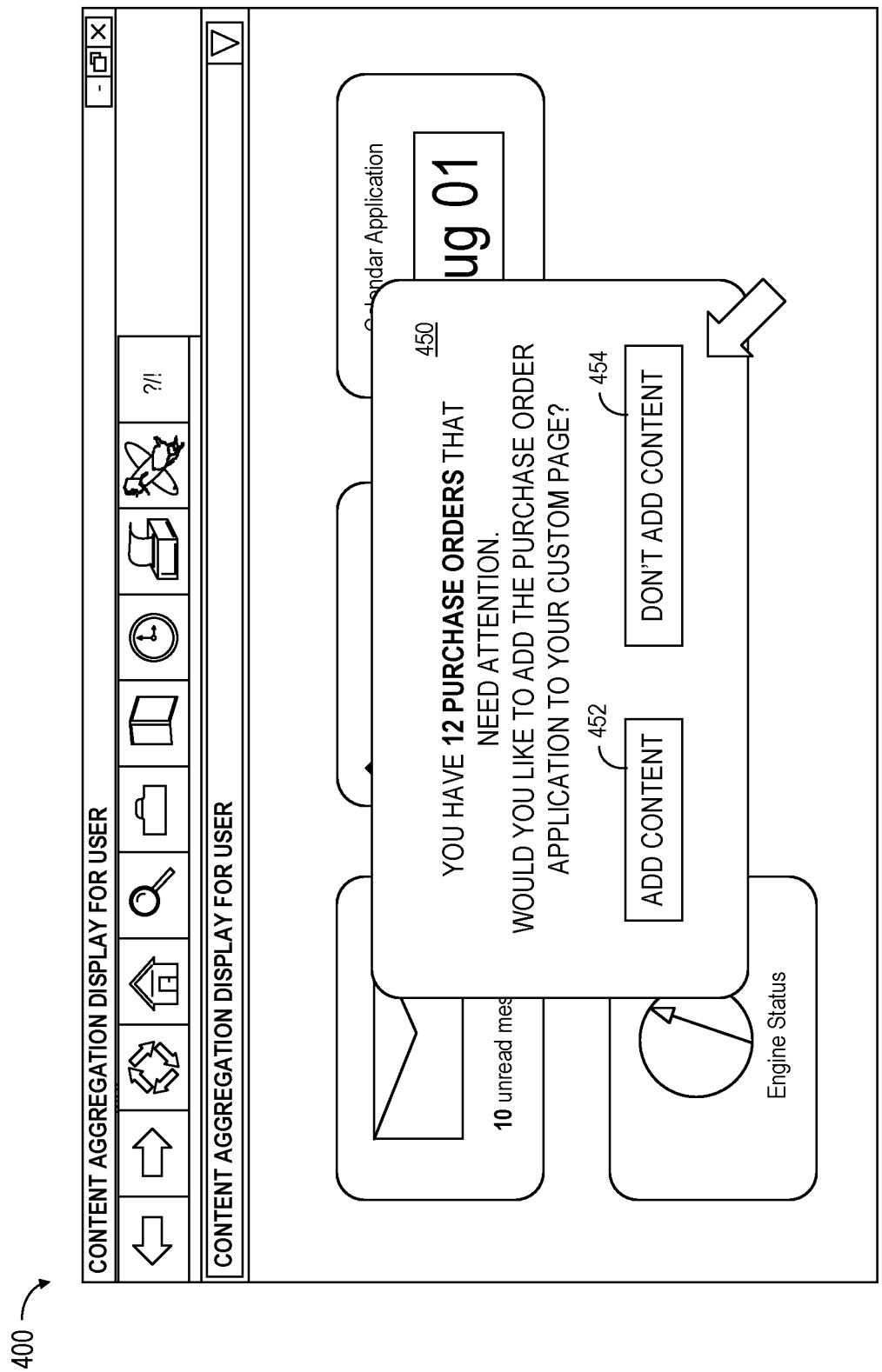

Consider, for example, FIG. 3 which is an example of a business content aggregation system display 300 according to some embodiments. The display might include tiles that can be activated by a user to launch an email application 310, view a monthly sales report 320, enter a calendar application 330, view an engine status 340, etc. The display 300 may be customized by each user such that he or she sees the tiles that are most relevant. Now consider that a system designer or administrator has defined, for a purchase order application, the following data context trigger criteria: (i) a data locator that points to a location in a data structure that indicates how may open purchase orders are currently associated with a particular user; (ii) an operator that indicates "greater than;" and (iii) a threshold that indicates "5 open purchase orders." In this case, a suggestion platform might evaluate the criteria the next time the user logs into the system and determine that the criteria is satisfied. As a result, and as illustrated by the display 400 in FIG. 4, a pop-up window 450 might be automatically displayed to the user asking if he or she would like to add the purchase order application to the custom home page. The user could then select an icon to indicate that the system should "add content" 352 or "don't add content" 354. Note that the suggestion to the user could be presented to the user (and the user's response) might be exchanged in any of a number of different ways.

Figure 5:
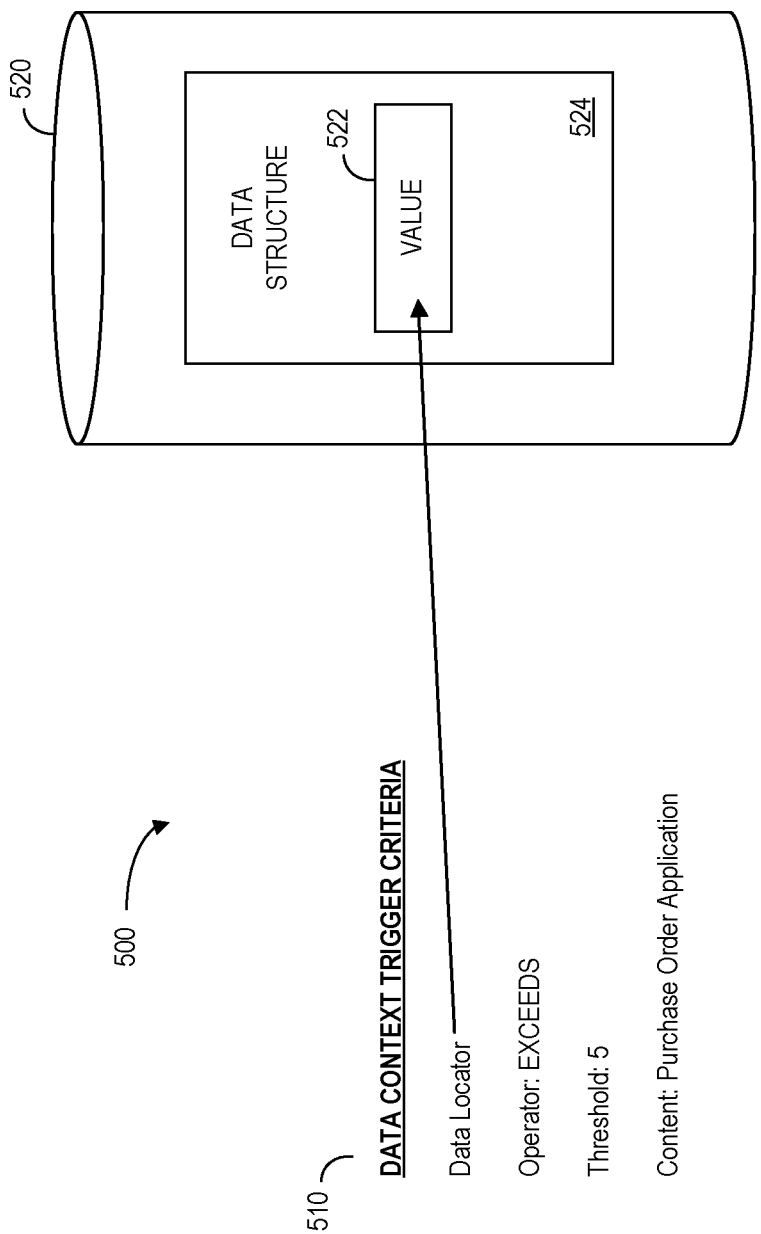
FIG. 5 illustrates an example of a relationship between a data context trigger criteria and business information in accordance with some embodiments.

FIG. 5 illustrates an example 500 of a relationship between a data context trigger criteria 510 and business information 520 in accordance with some embodiments. In particular the criteria 510 includes a data locator that points to a specific location/value 522 in a data structure 524. The criteria 510 also includes an operator (e.g., equal to, less than, etc.) and a threshold value that define when a particular content element should be suggested to a user.

Figure 6:
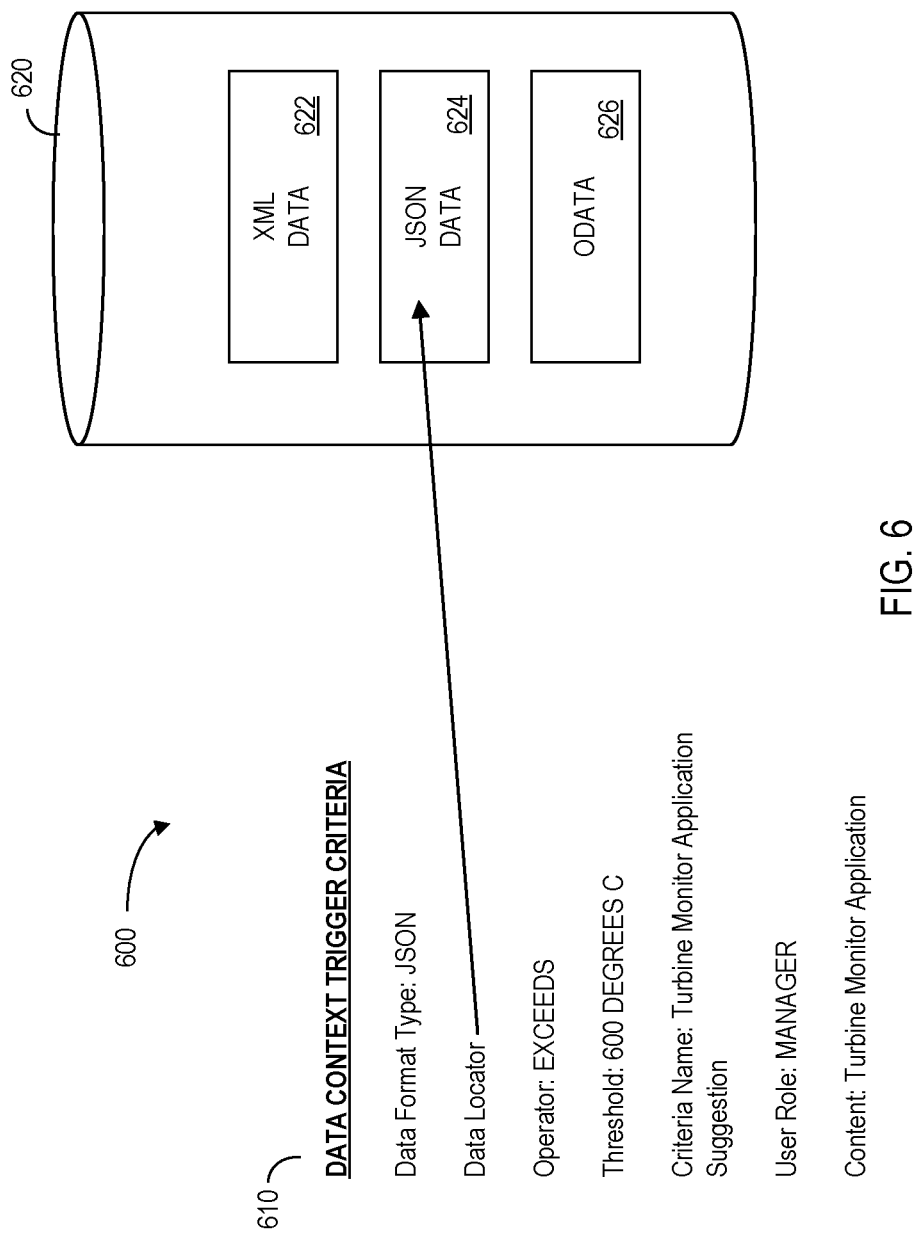
FIG. 6 illustrates another example of a relationship between a data context trigger criteria and business information in accordance with some embodiments.

FIG. 6 illustrates another example 600 of a relationship between a data context trigger criteria 610 and business information 620 in accordance with some embodiments. In this example, the criteria further includes an indication of a data format type. The data format type might indicate that business information 620 is formatted as XML data 622, JSON data 624, or OData 626. According to some embodiments, the business information might simply be stored as Hypertext Markup Language ("HTML") information. In the example 600 of FIG. 6, the criteria further includes a criteria name (e.g., to be displayed to a user or administrator) and a user role (e.g., indicating that the criteria only applies to managers).

Figure 7:
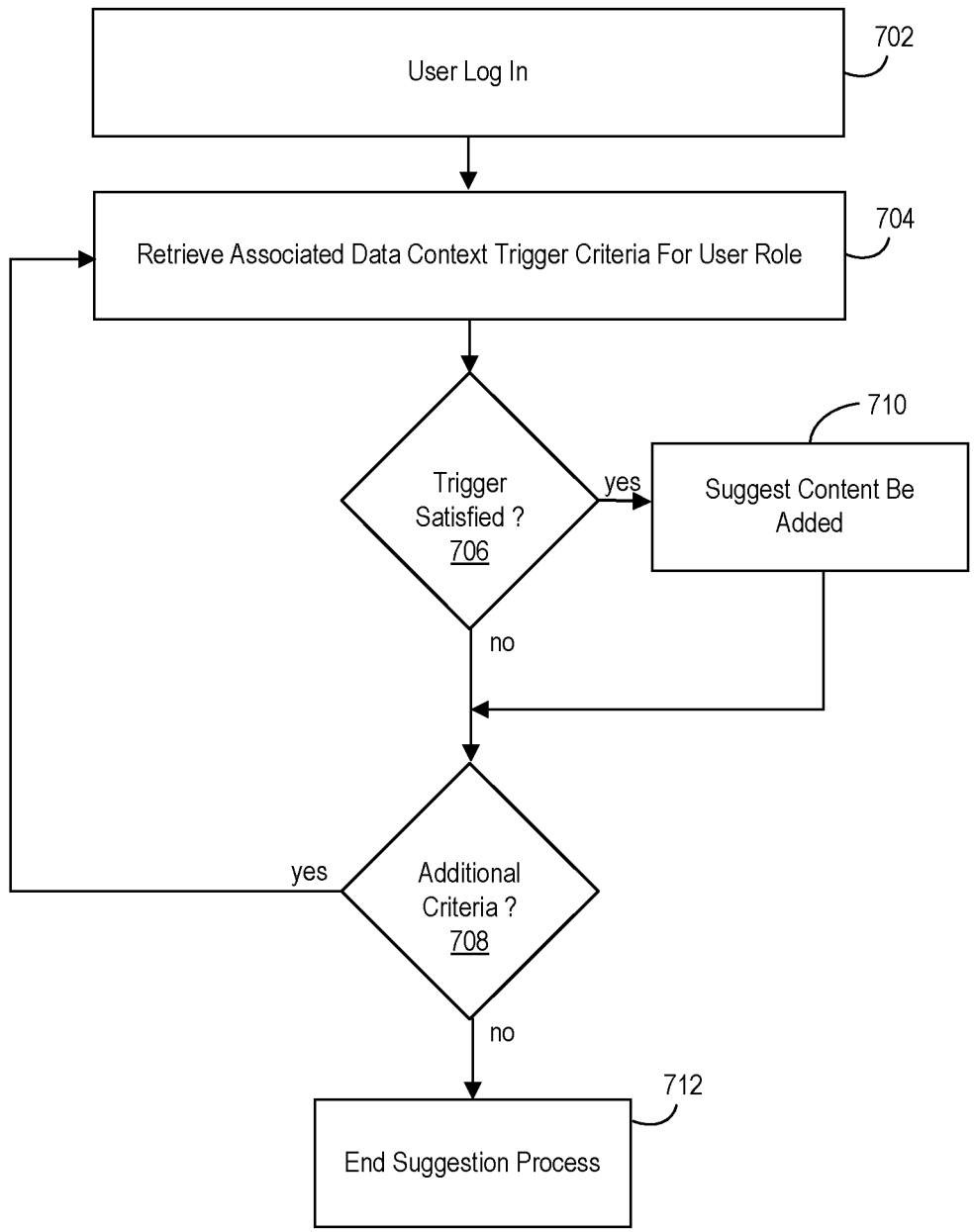
FIG. 7 is a flow diagram of an evaluation process in accordance with some embodiments.

FIG. 7 is a flow diagram of an evaluation process in accordance with some embodiments. The process may begin, according to some embodiments, at 702 a user logs into a content aggregation system. At 702, the system may retrieve the data context trigger criteria that are associated with the user' role within the organization. If it is determined that the trigger is satisfied at 706, the appropriate content may be suggested to the user at 710. If there are any additional criteria to consider at 708, the process continues. If there are no additional criteria to consider at 708, the process ends at 712.

Note that portal environments may allow users to customize content, by adding additional pages, applications, etc. to a custom navigation structure. To help users find relevant items that can be added, a portal environment might provide content suggestion based on metadata and/or usage analysis. For example, if a user has a meeting with the subject "Mobile Development," the system might suggest adding content related to the topic of mobile development. As another example, the system might suggest content which is frequently used by people that share some similar characteristics.

Note that such approaches may not be sufficient in connection with a business application. For example, when company revenues are dropping, such an approach would not suggest content to the user until he or she schedules a meeting called "Company Revenues" (or until colleagues notice the drop and use the corresponding report that reflects the decline). That is, once the system has enough information to be able to suggest the relevant content it may already be too late (e.g., the user or someone else in the organization is already aware of the status change, and the user has probably already added the relevant content).

According to some embodiments described herein, a "data-context" aware suggestion engine allows the system to suggest business applications and/or analytic reports in accordance with application/report data. Some embodiments may provide a tool allowing the system administrator to configure "catalogs" of available applications/reports to the system end users (in some cases by pre-defined user roles). For each application, the administrator might define the data Uniform Resource Locator ("URL") for fetching the application-specific data and indicate a data format out of a set of predefined formats. The formats may include, for example, XML, JSON, OData, etc. The administrator may also provide a "selector" used to retrieve a single data field from the data structure returned from the given URL. This selector may be format-dependent. For example, XPath might be used when working with any XML based formats, and JSONPath for JSON based formats. Optionally, the administrator may provide a user-friendly name for the data field that can be displayed to system users. According to some embodiments, the administrator may define criteria indicating that the current data value should be considered "important," and, as a result, the relevant content item will be suggested to the user. The criteria may be defined using an operator (e.g., >, <, =, or contains the string "abc") and a threshold value.

Once the configuration is defined, the system may fetch the application data and check the defined criteria at any point in time (e.g., periodically, on user login, or any other schedule). If the criteria is fulfilled, the system may suggest the application to the users who have it in their catalog. The system may also provide an explanation for suggesting the content item (e.g., using the administrator configured user-friendly name for the data field in use).

By way of example, an administrator may add "Turbine Temperature Monitor" application to a catalog, making it available for users with the role "Turbine Operator." The administrator configures the URL for a service exposing the turbine's status, selects "XML format," and defines the XPath expression that will retrieve the turbine's current temperature from the XML ("/hydro/turbine/temperature/text( )"). The administrator may also set the criteria operator to ">" (greater than), the threshold value to the threshold value to 600 (Degrees C.), and a user-friendly name for the field of "Turbine Temperature."

Figure 8:
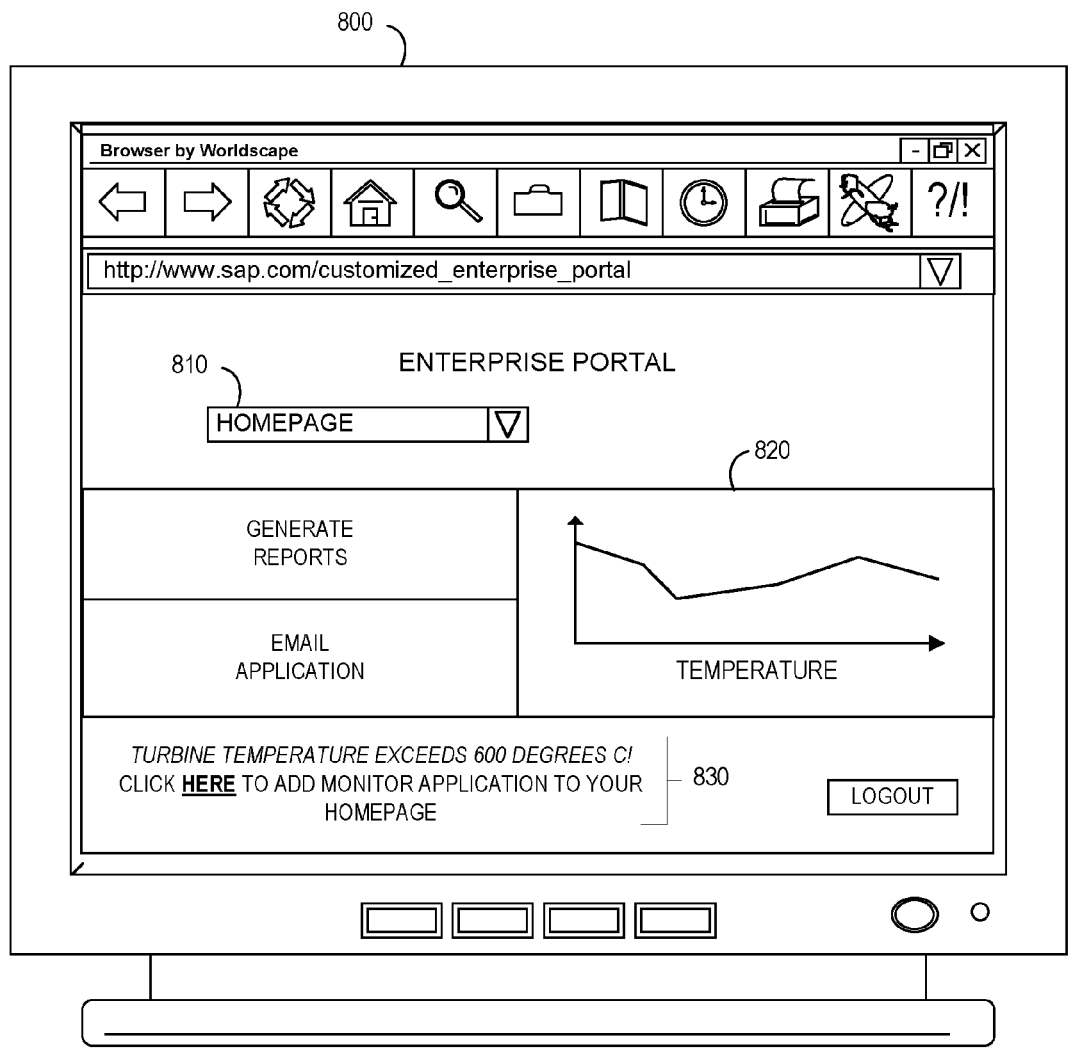
FIG. 8 is an example of a business content aggregation system display according to some embodiments.

When a user with the role of "Turbine Operator" logs into the system and loads 810 his or her home page display 800 as illustrated in FIG. 8 (including the usual display elements 820), the system identifies that the application is available in the catalog. The system may call the URL specified by the administrator, parses the XML response, and retrieved the turbine temperature using the XPath selector. The system may then check if the value is greater than 600 degrees C., and, if so, prompt 830 the user to add the application to his or her home page. The system might also provide an explanation that "Turbine Temperature Exceeds 600 Degrees C.!" If the user chooses to add the application, it may immediately be added to his or her home page display 800.

Figure 9:
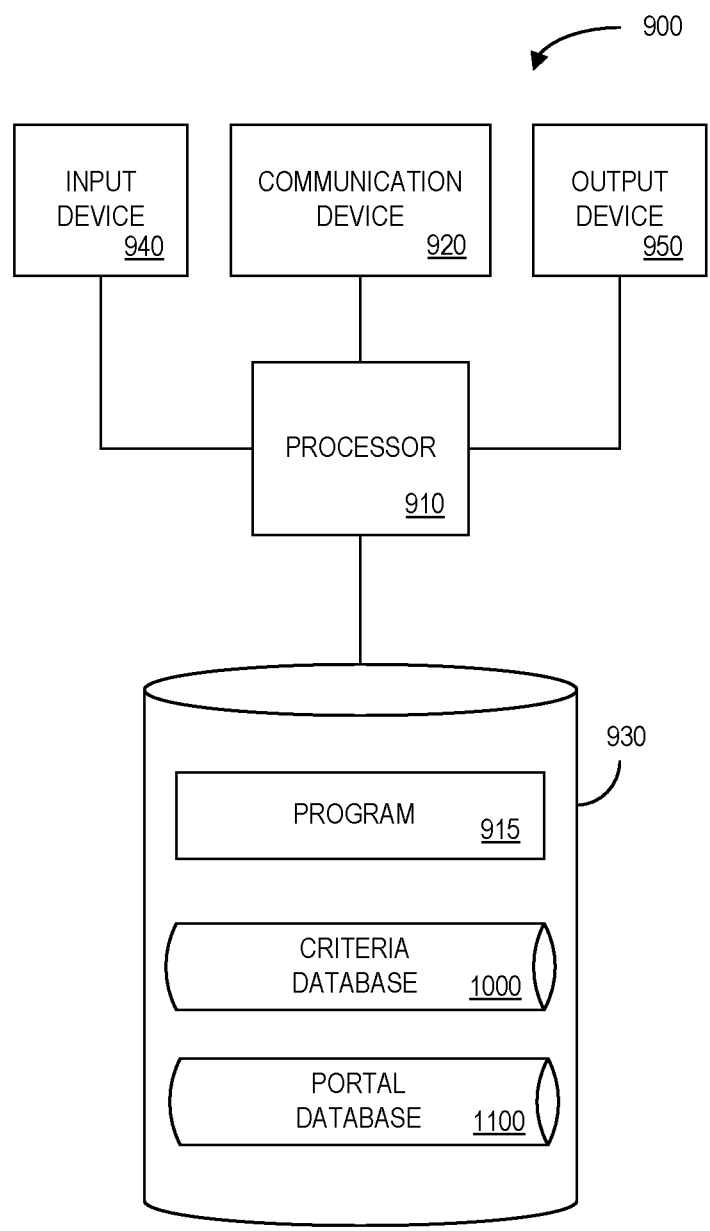
FIG. 9 is a block diagram of an apparatus according to some embodiments.

FIG. 9 is a block diagram overview of an apparatus 900 according to some embodiments. The apparatus 900 may be, for example, associated with a suggestion platform. The apparatus 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used, for example, to exchange business information. The apparatus 900 further includes an input device 940 (e.g., keyboard or computer mouse to enter criteria information) and an output device 950 (e.g., a display or printer to generate reports).

The processor 910 communicates with a storage device 930. The storage device 930 may comprise any appropriate information storage device, including combinations of magnetic storage devices (e.g., a hard disk drive), optical storage devices, and/or semiconductor memory devices. The storage device 930 stores a program 915 for controlling the processor 910. The processor 910 performs instructions of the program 915 and thereby operates in accordance with any of the embodiments described herein. For example, the processor 910 may access a plurality of data context trigger criteria associated with potential business information content elements. Each data context trigger criteria may include, for example: (i) a data locator associated with a business information data structure, (ii) an operator, and (iii) a threshold. For each data context trigger criteria, the processor 910 may automatically determine if a value in the business information data structure satisfies the data context trigger criteria based on the operator and the threshold. When a data context trigger criteria is satisfied, the processor may automatically suggest to a user that the potential business information content element associated with that data context trigger criteria be added to a user display of the content aggregation system The program 915 may be stored in a compressed, uncompiled and/or encrypted format. The program 915 may furthermore include other program elements, such as an operating system, a database management system, and/or device drivers used by the processor 910 to interface with peripheral devices.

As used herein, information may be "received" by or "transmitted" to, for example: (i) the apparatus 900 from another device; or (ii) a software application or module within the apparatus 900 from another software application, module, or any other source.

In some embodiments (such as shown in FIG. 9), the storage device 930 further stores a criteria database 1000 and a portal database 1100. Examples of databases that may be used in connection with the apparatus 900 will now be described in detail with respect to FIGS. 10 and 11. Note that the databases described herein are only examples, and additional and/or different information may be stored therein. Moreover, various databases might be split or combined in accordance with any of the embodiments described herein.

Figure 10:
FIG. 10 illustrates a portion of a criteria database that might be stored in accordance with some embodiments.

Referring to FIG. 10, a table is shown that represents the criteria database 1000 that may be stored at the apparatus 900 according to some embodiments. The table may include, for example, entries identifying content that might be automatically suggested to a user based on data context. The table may also define fields 1002, 1004, 1006, 1008, 1010 for each of the entries. The fields 1002, 1004, 1006, 1008, 1010 may, according to some embodiments, specify: criteria identifier 1002, content 1004, a locator 1006, an operator 1008, and a threshold 1010. The information in the criteria database 1000 may be created and updated, for example, based on information received from a system designer or customer.

The criteria 1002 may be, for example, a unique alphanumeric code identifying a data context trigger criteria. The content 1004 may represent an application or report that might be suggested to a user in the right circumstances. The locator 1006 may define where within a data structure a current business value can be retrieved. The operator 1008 and threshold 1010 may define trigger condition that, when satisfied, result in the automatic suggestion of the content 1004 to the user.

Referring to FIG. 11, a table is shown that represents the portal database 1100 that may be stored at the apparatus 900 according to some embodiments. The table may include, for example, entries identifying business portal home pages. The table may also define fields 1102, 1104, 1106, 1108 for each of the entries. The fields 1102, 1104, 1106, 1108 may, according to some embodiments, specify: a user identifier 1102, a role 1104, and content 1106, 1108. The information in the portal database 1100 may be created and updated, for example, as a user responds to suggestions automatically made by a suggestion platform.

The user identifier 1102 may be, for example, a unique alphanumeric code identifying a user, and the role 1104 may indicate his or her position and/or responsibilities within an enterprise. The content 1106, 1108 may represent elements that are to be included on his or her home page. Although two content elements are illustrated in FIG. 11, any number of content elements may be included in accordance with embodiments described herein. Thus, if a user accepts the systems suggestion that a particular application or report be added to his or her home page, the content 1106, 1008 may be updated accordingly.

Thus, some embodiments may establish methods and mechanisms to efficiently, accurately, and/or automatically suggest content to be added for a content aggregation system. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems and databases, note that embodiments may be associated with other types of enterprise data. For example, enrichment and enhancement of collected user action data with financial, governmental, educational, and/or medical processes and systems may be facilitated in accordance with any of the embodiments described herein.

Figure 12:
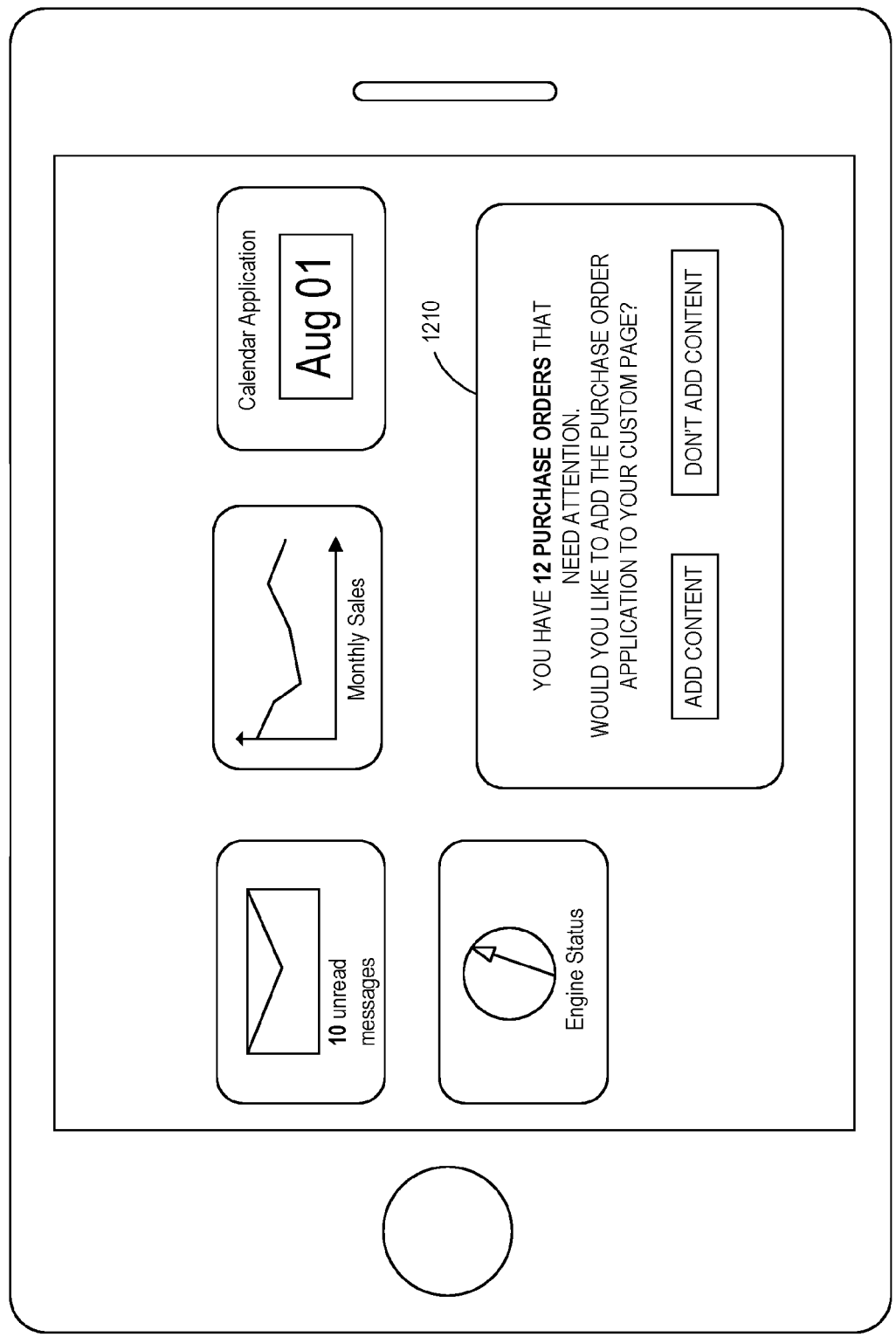
FIG. 12 is an example of a smartphone display according to some embodiments.

Moreover, while embodiments have been illustrated using particular types of tables and databases, embodiments may be implemented in any other of a number of different ways. For example, some embodiments might be associated with third-party and/or publically available information, such as flight or train schedules, stock prices, etc. available via web sites. Further, while examples have been provided for particular types of computer displays, note that embodiments may be associated any number of different types of displays. For example, FIG. 12 illustrates a smartphone display 1200 including the automatic suggestion of content 1210 according to some embodiments.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method associated with a content aggregation system, comprising:
   accessing, by a suggestion platform, a plurality of data context trigger criteria associated with potential business information content elements, each data context trigger criteria including: (i) a data locator that points to a location in a business information data structure where a value can be retrieved, (ii) an operator, and (iii) a threshold, wherein the potential business information content elements are at least one of an application and a report;
   for each data context trigger criteria, automatically determining by the suggestion platform when the value in the business information data structure satisfies the data context trigger criteria based on the operator and the threshold; and
   when a data context trigger criteria is satisfied, automatically suggesting, by the suggestion platform to a user, that the potential business information content element associated with that data context trigger criteria be added to a user display of the content aggregation system.

2. The method of claim 1, wherein each data context trigger criteria further includes an indication of a data format type.

3. The method of claim 2, wherein the indicated data format type is associated with at least one of: (i) extensible markup language information, (ii) java script object notation information, (iii) open data protocol information, and (iv) hypertext markup language information.

4. The method of claim 1, wherein each data context trigger criteria further includes at least one of: (i) a criteria name, and (ii) a user role.

5. The method of claim 1, wherein the content aggregation system comprises a business portal.

6. The method of claim 1, wherein a plurality of data context trigger criteria are associated with a single potential business information content element.

7. The method of claim 1, wherein a single data context trigger criteria is associated with a plurality of potential business information content elements.

8. The method of claim 1, wherein said automatic determination is performed at least one of: (i) in substantially real time, (ii) on a periodic basis, and (iii) upon a user action.

9. The method of claim 1, wherein the content aggregation system is associated with at least one of: (i) an Enterprise Resource Planning application, (ii) a Customer Relationship Management application, and (iii) an Advanced Business Application Programming application.

10. A non-transitory, computer-readable medium storing program code executable by a computer processor to perform a method associated with a content aggregation system, the method comprising:
    accessing, by a suggestion platform, a plurality of data context trigger criteria associated with potential business information content elements, each data context trigger criteria including: (i) a data locator that points to a location in a business information data structure where a value can be retrieved, (ii) an operator, and (iii) a threshold, wherein the potential business information content elements are at least one of an application and a report;
    for each data context trigger criteria, automatically determining by the suggestion platform when the value in the business information data structure satisfies the data context trigger criteria based on the operator and the threshold; and
    when a data context trigger criteria is satisfied, automatically suggesting, by the suggestion platform to a user, that the potential business information content element associated with that data context trigger criteria be added to a user display of the content aggregation system.

11. The medium of claim 10, wherein each data context trigger criteria further includes an indication of a data format type.

12. The medium of claim 11, wherein the indicated data format type is associated with at least one of: (i) extensible markup language information, (ii) java script object notation information, (iii) open data protocol information, and (iv) hypertext markup language information.

13. The medium of claim 10, wherein each data context trigger criteria further includes at least one of: (i) a criteria name, and (ii) a user role.

14. The medium of claim 10, wherein the content aggregation system comprises a business portal.

15. The medium of claim 10, wherein a plurality of data context trigger criteria are associated with a single potential business information content element.

16. The medium of claim 10, wherein a single data context trigger criteria is associated with a plurality of potential business information content elements.

17. The medium of claim 10, wherein said automatic determination is performed at least one of: (i) in substantially real time, (ii) on a periodic basis, and (iii) upon a user action.

18. The medium of claim 10, wherein the content aggregation system is associated with at least one of: (i) an Enterprise Resource Planning application, (ii) a Customer Relationship Management application, and (iii) an Advanced Business Application Programming application.

19. A suggestion platform associated with a content aggregation system, comprising:
    a storage device to store a plurality of data context trigger criteria associated with potential business information content elements, each data context trigger criteria including: (i) a data locator that points to a location in a business information data structure where a value can be retrieved, (ii) an operator, and (iii) a threshold, wherein the potential business information content elements are alt east one of an application and a report; and
    a processor coupled to the storage device and configured to: (i) for each data context trigger criteria, automatically determine when the value in the business information data structure satisfies the data context trigger criteria based on the operator and the threshold, and (ii) when a data context trigger criteria is satisfied, suggest to a user that the potential business information content element associated with that data context trigger criteria be added to a user display of the content aggregation system.

20. The platform of claim 19, wherein each data context trigger criteria further includes an indication of a data format type, and the indicated data format types include at least one of: (i) extensible markup language information, (ii) java script object notation information, (iii) open data protocol information, and (iv) hypertext markup language information.

21. The platform of claim 19, wherein each data context trigger criteria further includes at least one of: (i) a criteria name, and (ii) a user role.

22. The platform of claim 19, wherein the content aggregation system comprises a business portal associated with at least one of: (i) an Enterprise Resource Planning application, (ii) a Customer Relationship Management application, and (iii) an Advanced Business Application Programming application.

23. The platform of claim 19, wherein said automatic determination is performed at least one of: (i) in substantially real time, (ii) on a periodic basis, and (iii) upon a user action.

24. The method of claim 1, wherein the suggestion to the user is via an automatic display to the user.

25. The method of claim 24, further comprising:
    in response to the automatic display of the suggestion, selecting to one of: add the suggested content and not add the suggested content.

26. The method of claim 1, wherein the threshold is a value that defines when to suggest the content element to the user.

27. The method of claim 24, further comprising:
    providing an explanation for the suggestion on the display to the user.

* * * * *